(12) United States Patent
Miyazaki et al.

(10) Patent No.: US 8,878,916 B2
(45) Date of Patent: Nov. 4, 2014

(54) APPARATUS FOR MANUFACTURING THREE-DIMENSIONAL IMAGE DISPLAY DEVICE AND METHOD OF MANUFACTURING THREE-DIMENSIONAL IMAGE DISPLAY DEVICE

(75) Inventors: Kentaro Miyazaki, Yokohama (JP); Takashi Miyauchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1318 days.

(21) Appl. No.: 12/390,600

(22) Filed: Feb. 23, 2009

(65) Prior Publication Data

US 2009/0235542 A1  Sep. 24, 2009

(30) Foreign Application Priority Data

Mar. 18, 2008 (JP) .................. 2008-069843

(51) Int. Cl.
  *H04N 13/04* (2006.01)
  *H04N 9/47* (2006.01)
  *G02B 27/22* (2006.01)
(52) U.S. Cl.
  CPC ........ *G02B 27/2214* (2013.01); *H04N 13/0425* (2013.01); *H04N 13/0404* (2013.01)
  USPC .................. 348/59; 348/42; 348/51
(58) Field of Classification Search
  USPC ......................................... 348/59
  See application file for complete search history.

(56) References Cited

U.S. PATENT DOCUMENTS

| 2002/0069550 A1* | 6/2002 | Noguchi et al. ............... 33/623 |
| 2004/0169920 A1* | 9/2004 | Uehara et al. ................. 359/443 |
| 2005/0264651 A1* | 12/2005 | Saishu et al. .................. 348/51 |

FOREIGN PATENT DOCUMENTS

JP  3708112  8/2005

* cited by examiner

*Primary Examiner* — Jude Jean Gilles
*Assistant Examiner* — Jaren M Means
(74) *Attorney, Agent, or Firm* — Oblon, Spivak, McClelland, Maier & Neustadt, L.L.P.

(57) ABSTRACT

An apparatus for manufacturing a three-dimensional image display device attaches a display panel displaying an image to a lens plate having a lenticular lens, and includes: a display controller configured to display a positioning image on the display panel; an imager configured to take an image of the display panel through the lens plate, the display panel displaying the positioning image thereon; an obtaining unit configured to obtain a relative position of the display panel to the lenticular lens in a plane direction on the basis of an image thus taken; and a moving mechanism configured to perform positioning of the display panel relative to the lenticular lens by moving the display panel relative to the lens plate based on the relative position thus obtained.

4 Claims, 7 Drawing Sheets

APPARATUS FOR MANUFACTURING THREE-DIMENSIONAL IMAGE DISPLAY DEVICE AND METHOD OF MANUFACTURING THREE-DIMENSIONAL IMAGE DISPLAY DEVICE

CROSS REFERENCE OF THE RELATED APPLICATION

This application is based on and claims the benefit of priority from Japanese Patent Application No. 2008-069843, filed on Mar. 18, 2008; the entire contents of which are incorporated herein by reference.

BACKGROUND OF THE INVENTION

1. Field of the Invention

The present invention relates to an apparatus for manufacturing a three-dimensional image display device and a method of manufacturing a three-dimensional image display device.

2. Description of the Related Art

A flat panel display is generally used for a display panel of a three-dimensional image display device. Examples of the flat panel display include: a liquid crystal display (LCD) panel in which the light intensity is controlled using orientations of liquid crystals; a plasma display panel (PDP) in which phosphors are excited to emit light, by ultraviolet rays generated during plasma discharge; a field emission display (FED) panel in which phosphors are excited to emit light, by electron beams from field-emission electron emitters; and a surface-conduction electron emitter display (SED) panel in which phosphors are excited to emit light, by electron beams from surface-conduction electron emitters.

Various schemes are employed as a three-dimensional image display scheme, including a scheme using a multi-viewpoint imaging scheme and an integral imaging scheme. As a three-dimensional image display device employing any of the above schemes, a three-dimensional image display device including a lenticular lens has been developed. When the lenticular lens is used, a three-dimensional image can be observed without glasses for three-dimensional image observation.

In general, to dispose the lenticular lens on the display panel, a lens plate having the lenticular lens is attached to the display panel with an adhesion bond applied in a rectangular frame shape on the display panel. The positioning herein is performed using alignment marks on each of the display panel and the lens plate. These alignment marks are generally formed by machine work on each of the display panel and the lens plate. There have been proposed techniques of disposing the lenticular lens on a liquid crystal panel, in order to improve the light use efficiency (for example, see JP-B No. 3708112).

However, when the alignment marks formed by machine work are used, the position of the alignment marks may be less accurate due to poor working accuracy of forming the alignment marks on the display panel and the lens palate, or the like. Accordingly, it is difficult to confine the relative positions of the lenticular lens and the display panel in a plane direction within an allowable range (e.g., within a range of ±several μm from a target value) by performing the positioning based on the alignment marks formed by machine work. When the relative position is out of the allowable range, the center of a visual area is shifted, which adversely affects the visual area. Consequently, the display quality of a three-dimensional image is deteriorated.

SUMMARY OF THE INVENTION

An object of the present invention is to provide an apparatus for manufacturing a three-dimensional image display device and a method of manufacturing a three-dimensional image display device, by which the display quality of a three-dimensional image can be prevented from deteriorating.

A first aspect of the present invention is an apparatus for manufacturing a three-dimensional image display device, includes: a display controller configured to display a positioning image on a display panel, the positioning image being an image through which a line of pixels being a reference line of the display panel is lit, through which lines of pixels are lit, the lines of pixels corresponding to widths of cylindrical lenses and being arranged in a direction perpendicular to the reference line, and in which two position detection marks are shown on a straight line perpendicular to the reference line; an imager configured to take an image of the display panel through a lens plate having a lenticular lens in which the cylindrical lenses are arranged, the display panel displaying the positioning image thereon; an obtaining unit configured to obtain a relative position of the display panel to the lenticular lens in a plane direction on the basis of a luminance line and the two position detection marks both of which are in the image taken by the imager; and a moving mechanism configured to perform positioning of the display panel relative to the lenticular lens by moving the display panel relative to the lens plate based on the relative position thus obtained.

A second aspect of the present invention is a method of manufacturing a three-dimensional image display device, includes: displaying a positioning image on a display panel, the positioning image being an image through which a line of pixels being a reference line of the display panel is lit, through which lines of pixels are lit, the lines of pixels corresponding to widths of cylindrical lenses and being arranged in a direction perpendicular to the reference line, and in which two position detection marks are shown on a straight line perpendicular to the reference line; taking an image of the display panel through a lens plate having a lenticular lens in which the cylindrical lenses are arranged, the display panel displaying the positioning image thereon; obtaining a relative position of the display panel to the lenticular lens in a plane direction on the basis of a luminance line and the two position detection marks both of which are in the image thus taken; and performing positioning of the display panel relative to the lenticular lens by moving the display panel relative to the lens plate based on the relative position thus obtained.

DESCRIPTION OF THE PREFERRED EMBODIMENTS

An embodiment of the present invention will be described with reference to the drawings.
(Three-Dimensional Image Display Device)

Figure 1:
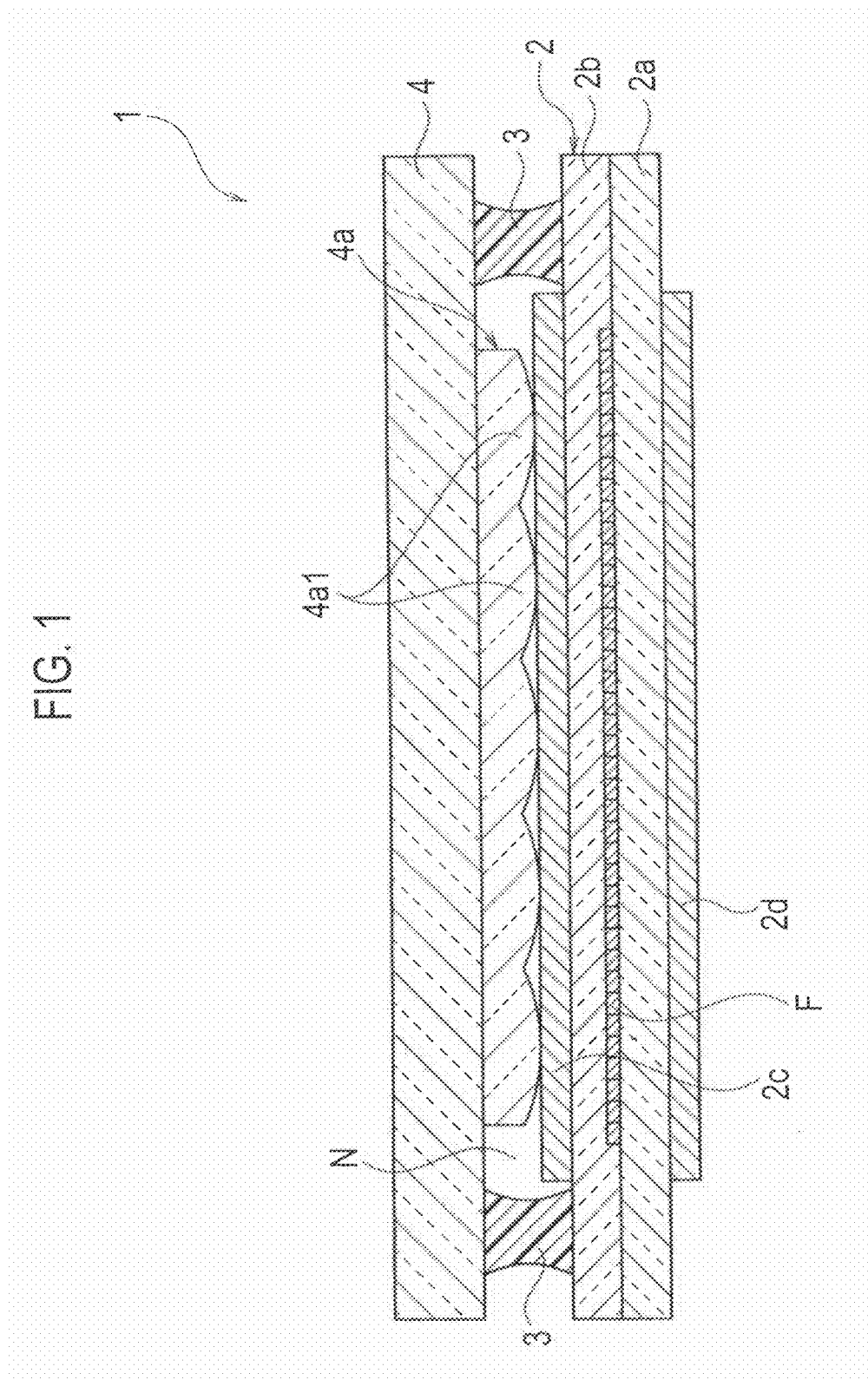
FIG. 1 is a cross-sectional view showing a schematic configuration of a display device according to an embodiment of the present invention.

As shown in FIG. 1, a three-dimensional image display device (called a display device below) 1 according to the embodiment of the present invention includes a display panel 2 configured to display an image, and a lens plate 4. The lens plate 4 is disposed on the display panel 2 with a frame-shaped bonding member 3 in between, and has a lenticular lens 4a on the side facing the display panel 2.

The display panel 2 has a first substrate 2a being a backside substrate and a second substrate 2b being a front-side substrate, both of which are, for example, array substrates. Inside the display panel 2, multiple pixels are arranged in a predetermined pattern, for example, in matrix (in grids). For example, a liquid crystal display panel is used as the display panel 2. There is a liquid crystal layer (not shown) between the first substrate 2a and the second substrate 2b. There are two deflecting plates 2c and 2d on the outer surfaces of the display panel 2, respectively. These deflecting plates 2c and 2d are disposed on the display panel 2 so as to be opposed to each other.

The first substrate 2a is, as an example, a rectangular glass substrate. Provided on the inner surface of the first substrate 2a (the surface facing the second substrate 2b: an upper surface in FIG. 1) are multiple pixel electrodes, electrical wirings for supplying the respective pixel electrodes with electrical potential (neither of which are shown), and the like. The pixel electrodes are arranged in dots in such a manner that each pixel electrode is provided for each pixel. The electrical wirings are provided in matrix (in grids) The second substrate 2b is, as an example, a rectangular glass substrate. Provided on the inner surface of the second substrate 2b (the surface facing the first substrate 2a: a lower surface in FIG. 1) are a color filter F, an opposite electrode (not shown) being a common electrode, and the like. The color filter F is configured of multiple color layers (red, green, and blue) arranged in dots or in stripes, and a light shielding layer such as a black matrix.

The bonding member 3 is a member for bonding the display panel 2 and the lens plate 4 together. The bonding member 3 is formed between the display panel 2 and the lens plate 4, for example in a rectangular-frame shape. An internal space N is formed as a result of joining the display panel 2 and the lens plate 4. The bonding member 3 functions as side walls of that internal space N which is formed by the display panel 2, the bonding member 3, and the lens plate 4. For example, a photocurable resin or the like is used as the bonding member 3.

The lens plate 4 is a lens member, such as a lens substrate or a lens sheet, having the lenticular lens 4a for generating three-dimensional images. The lens plate 4 is a substrate having for example a rectangular shape. The lenticular lens 4a is formed by arranging cylindrical lenses 4a1, each having a shape obtained by dividing a cylinder into two in its axial direction, adjacently in a direction (transverse direction) perpendicular to the axial direction (longitudinal direction, namely, a ridge direction). Each of the cylindrical lenses 4a1 is a cylindrical lens having curvature in one direction and one curved surface. The lenticular lens 4a is fixed onto the inner surface of the lens plate 4 to be part of the lens plate 4. Note that the lenticular lens 4a and the lens plate 4 may be formed separately and then integrated, or may be formed integrally using the same material from the beginning.

The display device 1 thus configured displays an image by changing optical characteristics of each pixel (liquid crystal layer). Here, the optical characteristics are changed by applying, in response to an image signal (image data), voltage to the pixel electrodes corresponding to the respective pixels arranged in matrix. Particularly, the display device 1 forms a three-dimensional image by using the integral imaging scheme of displaying multiple parallax images (two-dimensional images) which look slightly differently depending on the visual angle. The three-dimensional image thus formed is natural, easy to see, and less tiring on the eyes. Further, such a three-dimensional image can provide a continuous image.
(Apparatus for Manufacturing Three-Dimensional Image Display Device)

Next, a description will be given of a manufacturing apparatus 11 for manufacturing the above-described display device 1.

Figure 2:
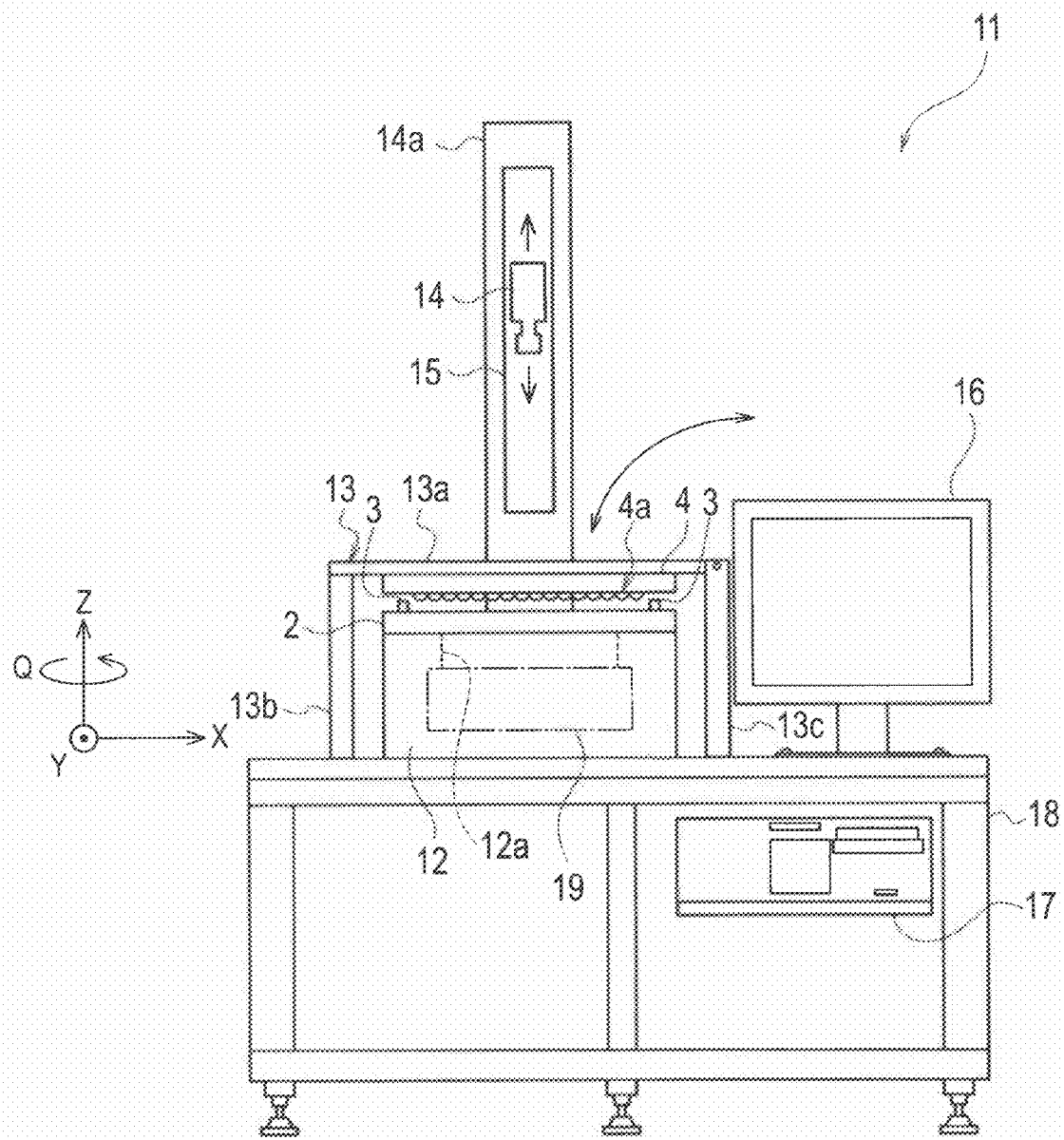
FIG. 2 is a schematic view showing a schematic configuration of an apparatus for manufacturing the display device according to the embodiment of the present invention.

As shown in FIG. 2, the manufacturing apparatus 11 according to the embodiment of the present invention includes: a stage moving mechanism 12 configured to function as a stage to place the display panel 2 thereon and move the display panel 2 thus placed in X, Y, Z, and θ directions; a supporting unit 13 configured to support the lens plate 4 at a predetermined height to face the stage moving mechanism 12; an imager 14 configured to perform an imaging operation; an imager moving mechanism 15 configured to move the imager 14 in the Z axis direction (vertical direction in FIG. 2); a display 16 configured to display an image taken by the imager 14, and the like; and a controller 17 configured to control the above parts. These parts are disposed on a rack 18.

The stage moving mechanism 12 functions as a stage supporting the display panel 2 by the weight of the display panel 2 and a holding mechanism (for example suction attachment, electrostatic adsorption, or the like). The display panel 2 is placed on a holding surface of the stage moving mechanism 12. The frame-shaped bonding member 3 is applied onto an attachment surface of the display panel 2 (see FIG. 3). Moreover, the stage moving mechanism 12 also functions as a moving mechanism configured to move the placed display panel 2 in the X, Y, Z, and θ directions (see FIG. 2). The stage moving mechanism 12 is disposed on the rack 18, and is connected to the controller 17 electrically. Note that the θ direction is a rotational direction on the X-Y plane in FIG. 2. The stage moving mechanism 12 performs positioning of the display panel 2 relative to the lens plate 4 (lenticular lens 4a) by moving the display panel 2 in the X, Y, and θ directions, and further performs attachment of the display panel 2 to the lens plate 4 by moving the display panel 2 in the Z axis direction. Accordingly, the stage moving mechanism 12 functions as a moving mechanism configured to perform moving operations of moving the display panel 2 relative to the lens plate 4. The moving operations include a positioning moving operation for positioning of the display panel 2 relative to the lenticular lens 4a of the lens plate 4, an attachment moving operation for attachment of the display panel 2 to the lens plate 4, and other operations.

A light irradiator 19, such as a backlight, configured to perform irradiation of light is provided inside the stage moving mechanism 12. The light irradiator 19 is turned on to display an image when the display panel 2 is to be attached to the lens plate 4. The light irradiator 19 is connected to the controller 17 electrically, and turned on and off in response to control performed by the controller 17. Further, an opening 12a is formed in the stage moving mechanism 12, and light emitted from the light irradiator 19 is incident on the display panel 2 through the opening 12a.

The supporting unit 13 includes a holding frame 13a for detachably holding the lens plate 4, and paired supporting plates 13b and 13c for supporting the holding frame 13a at a predetermined height from the stage moving mechanism 12. The holding frame 13a holds the periphery of the lens plate 4 by means of a holding mechanism (using for example suction attachment, electrostatic adsorption, or the like). For example, the holding frame 13a is made of a translucent material such as a transparent material so as not to interfere with the imaging performed by the imager 14. The paired supporting plates 13b and 13c are disposed at positions facing each other with the stage moving mechanism 12 in between, and fixed onto the rack 18. One edge of the holding frame 13a is rotatably fixed to an upper edge portion of the supporting plate 13c. A free edge of the holding frame 13a holding the lens plate 4 comes into contact with an upper edge portion of the supporting plate 13b. Thereby, the lens plate 4 is positioned at a predetermined height facing the display panel 2 on the stage moving mechanism 12. Then, the free edge of the holding frame 13a is fixed to the upper edge portion of the supporting plate 13b with a fixing member such as a screw. Thereafter, the display panel 2 is attached to the lens plate 4.

The imager 14 acquires an image by performing an imaging operation on the display panel 2 from a visual distance through the lens plate 4. The imager 14 is supported by a column support 14a so as to be movable in the Z axis direction which is away from and toward the stage moving mechanism 12 (vertical direction in FIG. 2). The imager 14 is electrically connected to the controller 17. The column support 14a is fixed onto the rack 18. For example, a CCD camera or the like is used as the imager 14. Focusing of the imager 14 is performed by vertically moving the imager 14 by using the imager moving mechanism 15, with an auto focus function, or the like.

The imager moving mechanism 15 is a moving mechanism which is provided to the column support 14a on the rack 18 and which moves the imager 14 in the Z axis direction. The imager moving mechanism 15 is fixed to the column support 14a, and is connected to the controller 17 electrically. For example, a linear motor mechanism, a feed screw mechanism, or the like is used as the imager moving mechanism 15. The imager 14 is provided to the imager moving mechanism 15 by a supporting member such as an arm member.

The display 16 displays an image taken by the imager 14, and the like. The display 16 is disposed on the rack 18, and is connected to the controller 17 electrically. For example, a liquid crystal display, a cathode ray tube (CRT) display, or the like is used as the display 16.

The controller 17 includes a control part for intensively controlling each part, and a memory for storing therein various programs, various kinds of data, and the like (neither of which are shown). The memory includes random access memory (RAM), non-volatile memory, and the like that function as a work area for the control part. The controller 17 controls each part based on the various programs and the various kinds of data stored in the memory. Particularly, the controller 17 performs processing such as a series of data processing for performing data calculation, data processing, or the like, and attachment processing for attaching the display panel 2 to the lens plate 4. The attachment processing includes imaging processing for performing imaging, display processing for displaying an image, and positioning processing for performing positioning. Additionally, various parameters, such as imaging conditions, image data for positioning, and the like, are stored in the memory. The controller 17 functions as a display controller and an obtaining unit.

Next, a description will be given of operations (method) performed by the manufacturing apparatus 11 to manufacture the display device 1. In the operations, the controller 17 of the manufacturing apparatus 11 performs the attachment processing and controls each part. When the attachment processing is to be performed, the display panel 2 is placed on the stage moving mechanism 12, and the lens plate 4 is located at a predetermined position facing the display panel 2 on the stage moving mechanism 12, with the holding frame 13a being closed (see FIGS. 2 and 3).

Figure 4:
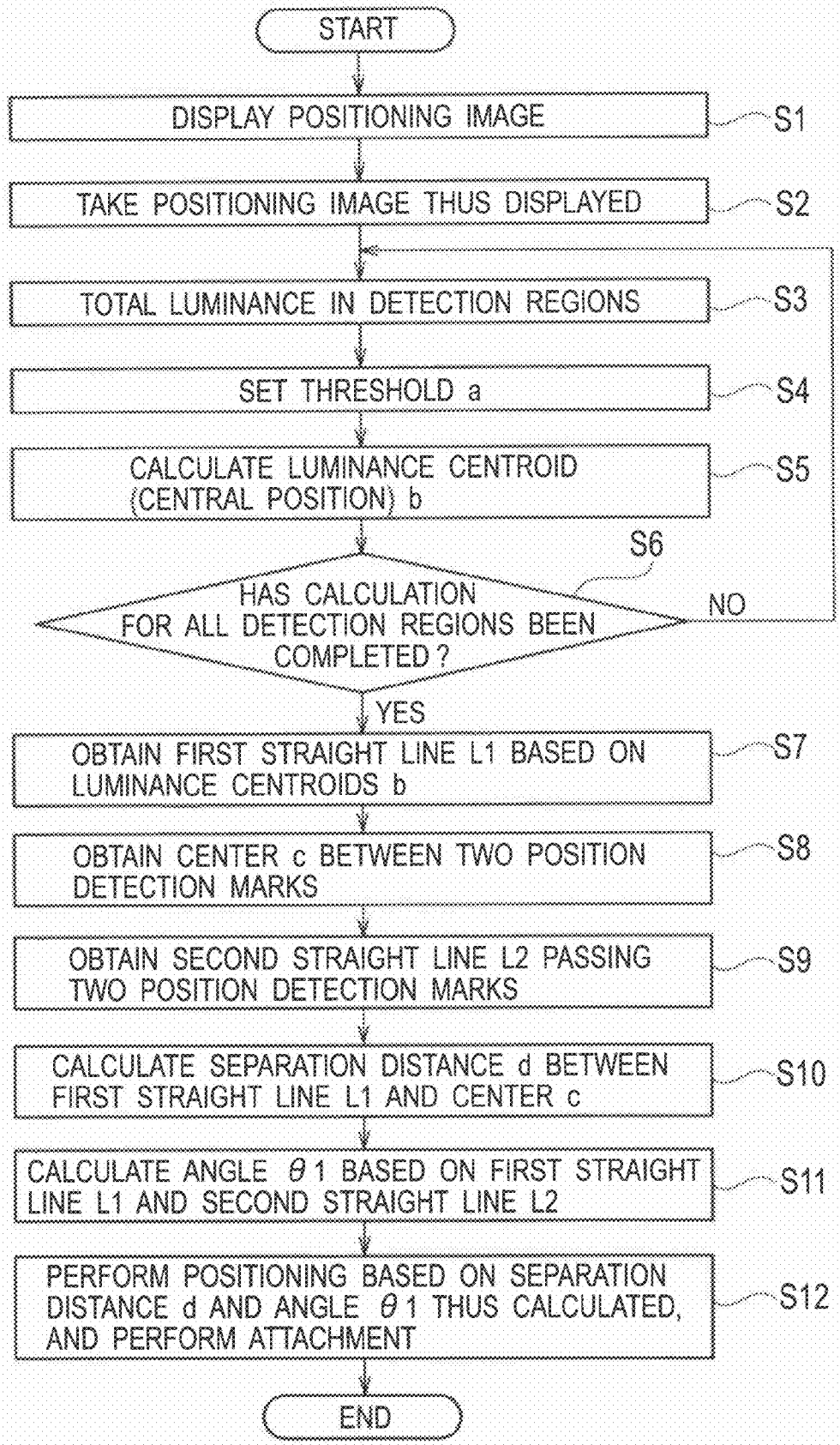
FIG. 4 is a flowchart showing a procedure of attachment processing performed by the manufacturing apparatus shown in FIG. 2.

As shown in FIG. 4, the controller 17 displays a positioning image G1 (see FIG. 5) (Step S1). More specifically, with the holding frame 13a being closed, the controller 17 causes the light irradiator 19 to perform an irradiation operation to display the positioning image G1 on the display panel 2. The irradiation operation mentioned here is an operation of irradiating the display panel 2 with light for image display.

Figure 5:
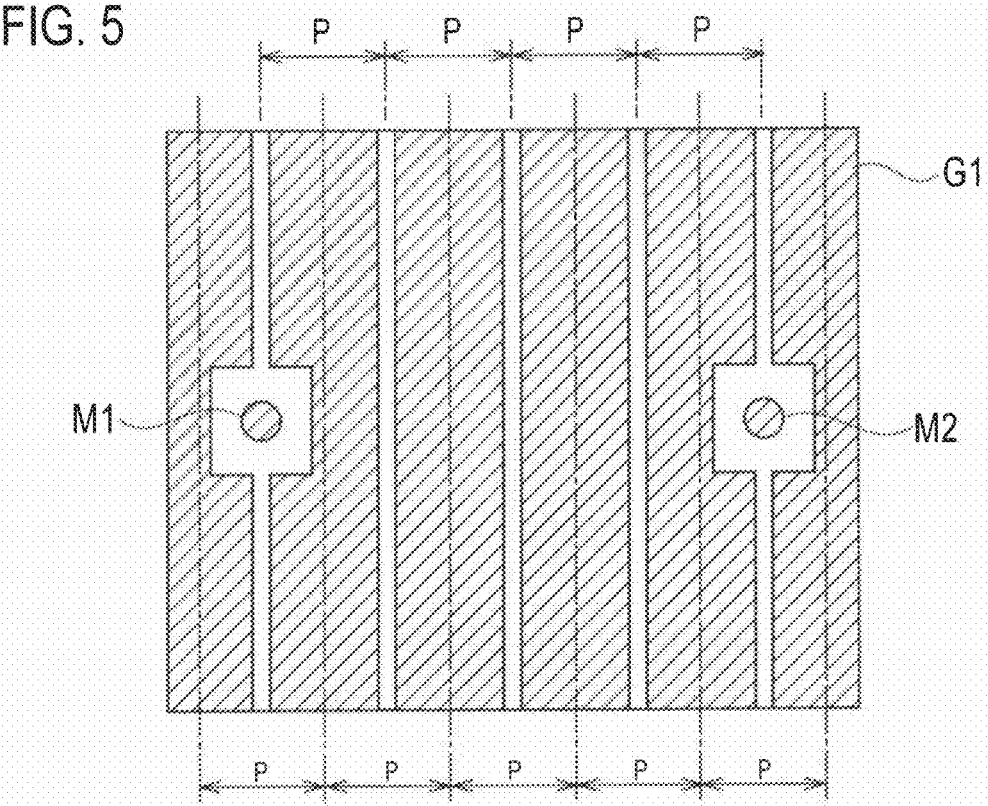
FIG. 5 is a plane view showing an example of a positioning image.

As shown in FIG. 5, the positioning image G1 is an image (alignment chart that is a striped chart having alignment marks for positioning) through which there are lit: a line of pixels (pixel line) being a reference line (e.g., a center line) of the display panel 2; and also lines of pixels (pixel lines) arranged at lens pitches P of the lenticular lens 4a in a direction perpendicular to the reference line, and in which two position detection marks M1 and M2 are shown on a straight line intersecting the reference line. Here, the reference line is a line acting as a benchmark for various designs for forming a three-dimensional image. The lens pitch P of the lenticular lens 4a is a width of each cylindrical lens 4a1, namely, a width of the cylindrical lens 4a1 in a direction perpendicular to the axial direction (ridge direction). This positioning image G1 is displayed on a display screen of the display panel 2. The positioning image G1 is, in other words, an image through which a line of pixels (including the pixels of the reference line) at the center per lens pitch P of the lenticular lens 4a is lit, and in which the position detection marks M1 and M2 are shown on a straight line intersecting the pixel lines.

Next, the controller 17 takes an image of the positioning image G1 thus displayed (Step S2). More specifically, with the holding frame 13a being closed, the controller 17 causes the stage moving mechanism 12 to move the lens panel 2 toward the lens plate 4 to a predetermined position for imaging, and then causes the imager 14 to perform the imaging operation. The imaging operation mentioned here is an operation of performing imaging on the display panel 2 on the stage moving mechanism 12 through the lens plate 4.

Figure 3:
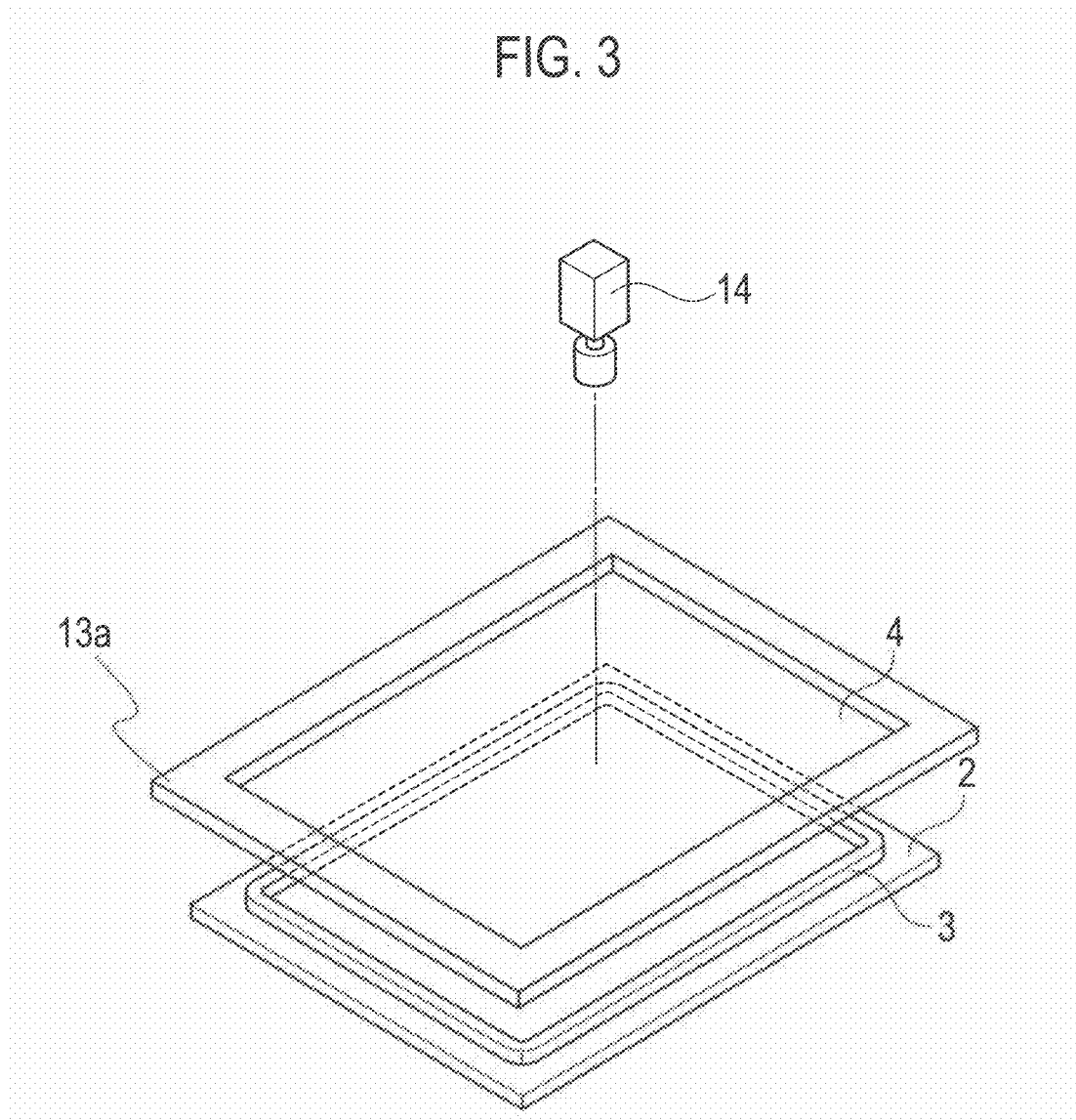
FIG. 3 is an explanation view for explaining a positioning operation of the manufacturing apparatus shown in FIG. 2.
Figure 6:
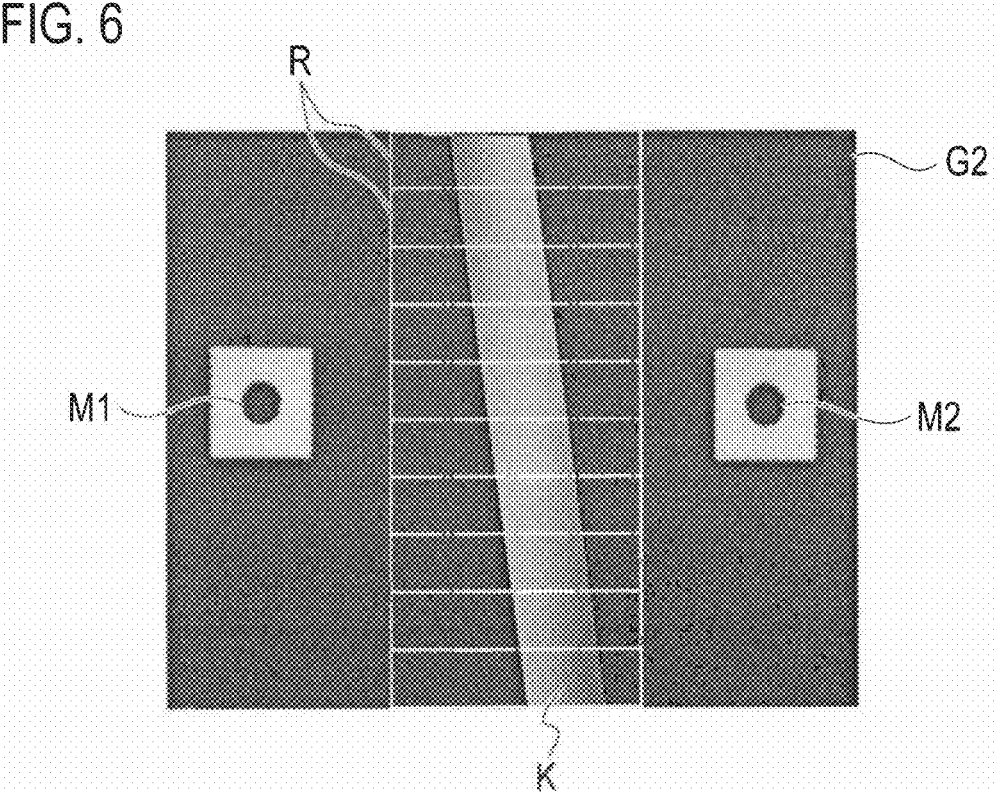
FIG. 6 is a plane view showing an example of an imaged image obtained before positioning.

As shown in FIGS. 2 and 3, the lens plate 4 is positioned between the display panel 2 on the stage moving mechanism 12 and the imager 14, with the holding frame 13a being closed. With the lens plate 4 being thus adjacent to the display panel 2, the imaging operation is performed by the imager 14. Here, the lenticular lens 4a of the lens plate 4 is positioned on the side facing the display panel 2. An image G2 as shown in FIG. 6 is acquired as a result of the imaging operation by the imager 14, and is then displayed on the display 16. The image G2 is an example of an image in which the relative position of the display panel 2 to the lens plate 4 (the lenticular lens 4a) shifts in a plane direction.

Figure 7:
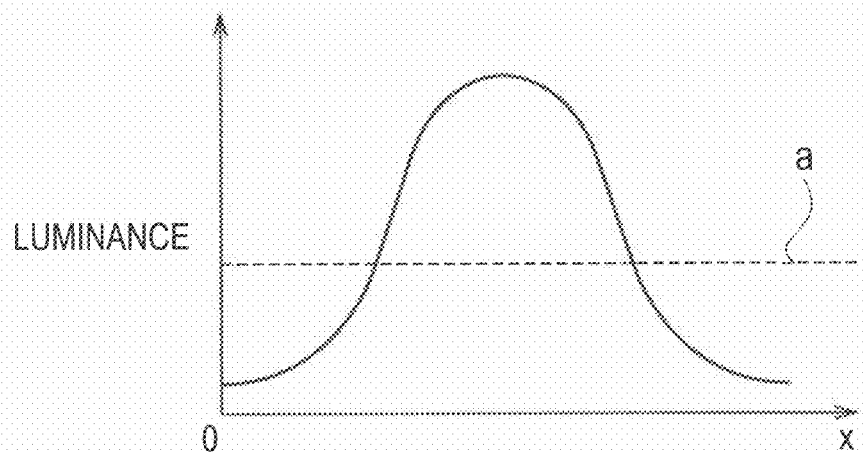
FIG. 7 is an explanation view for explaining a luminance distribution.
Figure 8:
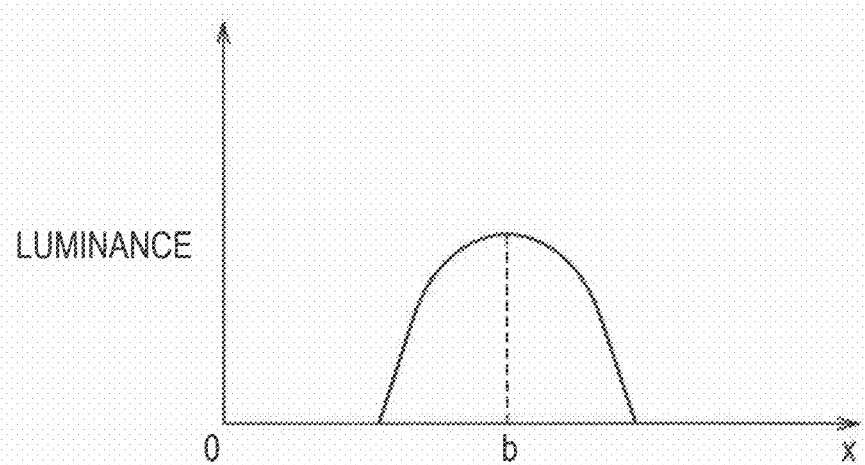
FIG. 8 is an explanation view for explaining a luminance centroid.

Next, the controller 17 totals the luminance of each pixel in each detection region R (see FIG. 6) (Step S3), sets a threshold a (Step S4), and calculates a luminance centroid (central position) b (Step S5). A luminance distribution as shown in FIG. 7 is obtained as a result of the luminance totaling. Then, the threshold a is set to a predetermined luminance value, namely, is set to exclude the both ends of a luminance waveform. Thereby, a luminance distribution as shown in FIG. 8 is obtained. Lastly, the luminance centroid b is calculated based on the luminance distribution.

Here, multiple pieces (e.g., in the order of several tens) of the detection regions R are set in the image G2. These detection regions R are arranged sequentially in the axial directions of the cylindrical lenses 4a1 of the lenticular lens 4a so as to divide a luminance line (light strip) K in the thus-taken image G2. The width of each detection region R (the width in a direction perpendicular to the axial direction of the cylindrical lens 4a1) is set to be larger than the lens pitch P of the lenticular lens 4a. As mentioned, the display panel 2 is disposed at a predetermined position on the stage moving mechanism 12, and the lens plate 4 is also positioned at a predetermined position facing the display panel 2 on the stage moving mechanism 12. Accordingly, the relative position shift between the display panel 2 and the lens plate 4 in the plane direction is in the order of several tens to hundreds μm. The detection regions R can therefore be set in advance.

Figure 9:
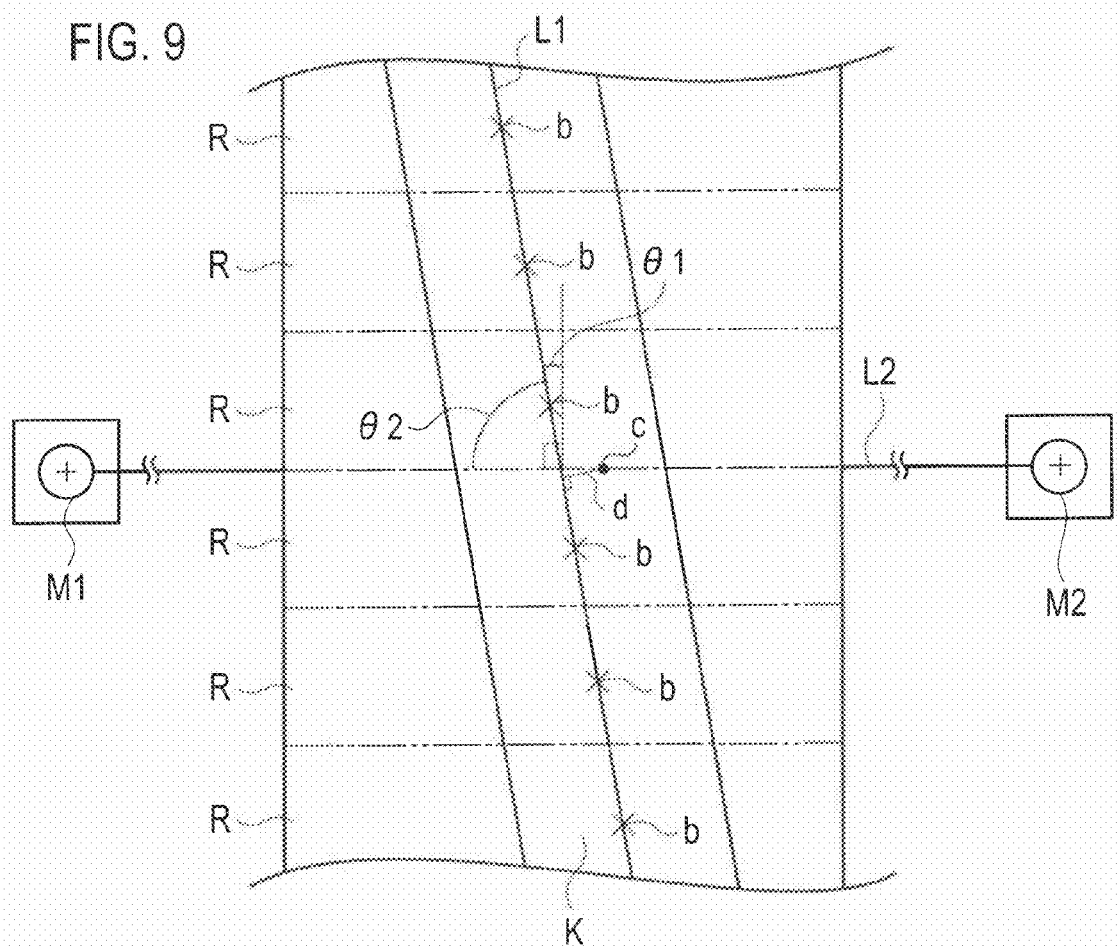
FIG. 9 is an explanation view for explaining calculation of a first straight line, a second straight line, a separation distance, and an angle.

Then, determination is made on whether the luminance centroid b has already been calculated for all of the detection regions R (Step S6). When determined as negative, Steps S3 to S5 are repeated to wait for calculation of the luminance centroids b for all of the detection regions R to be completed (NO in Step S6). When it is determined that calculation has already been performed on all of the detection regions R (YES in Step S6), a first straight line L1 is obtained based on the luminance centroids b (Step S7). As shown in FIG. 9, the first straight line L1 is obtained by a straight-line approximation to the luminance centroids b. A calculation method such as a least-squares method is employed for this calculation.

Next, the controller 17 obtains a center c between the two position detection marks M1 and M2 (Step 8), and obtains a second straight line L2 passing (the centers of) the two position detection marks M1 and M2 (Step 9). As shown in FIG. 9, the center c between the two position detection marks M1 and M2 and the second straight line L2 are obtained by calculation based on the coordinates of each of the two position detection marks M1 and M2.

Moreover, the controller 17 calculates a separation distance d between the obtained center c and the obtained first straight line L1 (Step S10), and further calculates an angle θ1 based on the first straight line L1 and the second straight line L2 (Step S11). As shown in FIG. 9, the separation distance d is obtained by calculation of a shortest distance between the center c and the first straight line L1. In addition, as shown in FIG. 9, the angle θ1 is obtained by calculating an angle θ2 between the first straight line L1 and the second straight line L2 and then by subtracting the angle θ2 from 90° (θ1=90−θ2). What is obtained thereby is an amount of shift in the X-axis and θ directions (the separation distance d and the angle θ1), namely, the relative position of the display panel 2 to the lenticular lens 4a in the plane direction.

Figure 10:
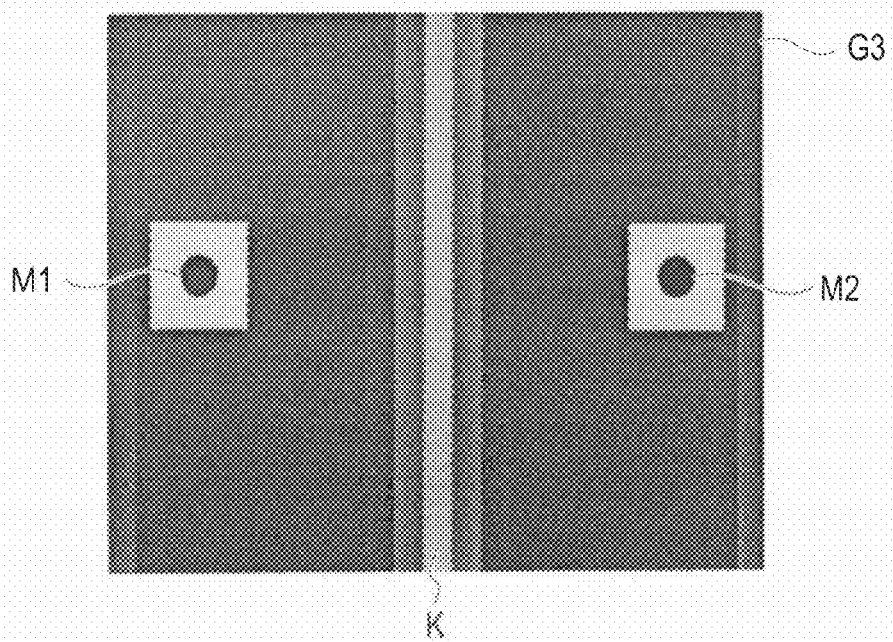
FIG. 10 is a plane view showing an example of an imaged image obtained after positioning.

Thereafter, the controller 17 performs positioning based on the obtained separation distance d and the obtained angle θ1, and then performs attachment (Step S12). More specifically, the controller 17 causes the stage moving mechanism 12 to perform the moving operation for positioning, and then to perform the moving operation for attachment after the positioning is completed. By these operations, the display panel 2 on the stage moving mechanism 12 is slid by the separation distance d, and is rotated by the angle θ1. The positioning of the display panel 2 relative to the lenticular lens 4a in the plane direction is thus completed. Thereafter, the display panel 2 on the stage moving mechanism 12 gets close to the lens plate 4, the bonding member 3 is pressured, and the display panel 2 contacts the lenticular lens 4a. The attachment of the display panel 2 to the lens plate 4 is thus completed. When the controller 17 causes the imager 14 to perform the imaging operation after the positioning, an image G3 as shown in FIG. 10 is obtained. In essence, the image G2 shown in FIG. 6 results in the image G3 shown in FIG. 10 after the positioning. A fact that the positioning has been accurately performed can be recognized with the image G3.

Lastly, the bonding member 3 is irradiated with light for temporary curing so as to be cured temporarily. Thereafter, the display device 1 is delivered from the stage moving mechanism 12 to an apparatus for full curing by hand or by a machine such as a robot. The bonding member 3 is then cured fully to the inside in that apparatus.

The manufacturing steps for such attachment processing include steps of: displaying the positioning image G1 by irradiating the display panel 2 that displays an image with light; performing imaging on the display panel 2 through the lens plate 4; obtaining the relative position of the display panel 2 to the lenticular lens 4a in the plane direction based on the image G2 thus taken; performing positioning of the display panel 2 relative to the lenticular lens 4a in the plane direction based on the obtained relative position, and performing attachment of the display panel 2 to the lens plate 4 after the positioning is completed.

Here, the display panel 2 and the lens plate 4 need to be attached together so that the relative position shift between the display panel 2 and the lenticular lens 4a can fall within an allowable range (e.g., within a range of ±several μm of a target value). If the shift amount is large, the relative position shift is out of the allowable range. This shifts the center of a visual area, which adversely affects the visual area. As a consequence, the display quality of the three-dimensional image is deteriorated. For example, the shift amount needs to be up to about 10 mm.

In the manufacturing steps mentioned above, the positioning image G1 is displayed on the display panel 2 while the display panel 2 is irradiated with light for image display. Then, the imaging operation is performed on the display panel 2 through the lens plate 4. As a result, the image G2 as shown in FIG. 6 is obtained as an imaged image. Here, the position of the display panel 2 is specified by the position detection marks M1 and M2 which are shown in the image displayed on the display panel 2. Moreover, the position of the lenticular lens 4a of the lens plate 4 is specified by the luminance line (light strip) K in the image G2. The relative position of the display panel 2 to the lenticular lens 4a in the plane direction, namely, the shift amount in the X-axis and θ directions, is obtained based on the position detection marks M1 and M2 and the luminance line K.

Therefore, the relative position of the display panel 2 to the lenticular lens 4a in the plane direction is obtained with high accuracy, compared to the case of using alignment marks formed by machine work. Based on the highly-accurate relative position, positioning of the display panel 2 relative to the lenticular lens 4a in the plane direction is performed so as to cancel the shift amount. By this positioning, the relative position of the display panel 2 to the lenticular lens 4a in the plane direction falls within the allowable range (e.g., within a range of ±several μm of a target value), which minimizes the shift of the center of the visual area.

As described above, according to the embodiment of the present invention, imaging is performed on the display panel 2, on which the positioning image G1 is displayed, through the lens plate 4 having the lenticular lens 4a. Then, based on the image G2 thus taken, the relative position of the display panel 2 to the lenticular lens 4a in the plane direction is obtained. In this way, the highly-accurate relative position of the display panel 2 to the lenticular lens 4a in the plane direction is obtained without using the regular alignment marks formed by machine work. Then, based on the relative position thus obtained, the positioning of the display panel 2 relative to the lenticular lens 4a is performed. In this way, the relative positions of the display panel 2 and the lenticular lens 4a in the plane direction can be confined within the allowable range (e.g., within a range of ±several μm of a target value). As a consequence, the shift of the center of the visual area can be minimized, and the display quality of the three-dimensional image can be prevented from deteriorating.

Further, the positioning image G1 is displayed. The positioning image G1 is an image through which there are lit: a line of pixels (pixel line) being a reference line (e.g., a center line) of the display panel 2; and also lines of pixels (pixel lines) arranged at lens pitches P of the lenticular lens 4a in a direction intersecting the reference line, and in which two position detection marks M1 and M2 are shown on a straight line intersecting the reference line. Then, the luminance centroid b is obtained for each of the multiple detection regions R dividing the luminance line K in the taken image G2. The first straight line L1 is obtained based on the luminance centroids b. The center c of the display panel 2 is further obtained based on the two position detection marks M1 and M2, and the second straight line L2 passing the two position detection marks M1 and M2 is obtained. In addition, the separation distance d is calculated using the obtained first straight line L1 and the obtained center c, and the angle $\theta 1$ between the obtained first straight line L1 and the obtained second straight line L2 is calculated. In this manner, information to be used for the positioning can be obtained by simple calculation processing. As a result, the load on the controller 17 as well as the processing time can be reduced.

In addition, the light irradiator 19 is provided. The positioning image G1 is displayed on the display panel 2 while the light irradiator 19 irradiates the display panel 2 with light. Accordingly, the image can be displayed by the irradiation of the light irradiator 19 even if the display panel 2 is a panel incapable of self light emission, such as a liquid crystal display panel.

(Other Embodiments)

It should be noted that the present invention is not limited to the embodiment described above, and can be modified in various ways without departing from the scope of the present invention.

For example, although a liquid crystal display (LCD) panel is used as the display panel 2 in the above embodiment, the present invention is not limited to this. Alternatively, other panels such as a plasma display panel (PDP), a field emission display (FED) panel, or a surface-conduction electron-emitter display (SED) may be employed. Here, if the display panel 2 is a panel capable of emitting light to display an image, the display panel 2 may be connected to the controller 17 and caused to display an image when necessary. In this case, the light irradiator 19 is not needed.

Moreover, although the positioning image G1 as shown in FIG. 5 is displayed in the above embodiment, the present invention is not limited to this. Further, although the circular position detection marks M1 and M2 as shown in FIG. 5 are displayed in the above embodiment, the present invention is not limited to such shape. The position detection marks may also be shaped as a square or diamond. Further, although the number of the position detection marks M1 and M2 displayed is two in the above embodiment, the number is not limited to this.

Additionally, although the detection regions R are set in advance in the above embodiment, the present invention is not limited to this. For example, the detection regions R may alternatively be set by dividing a region including the luminance line K (light strip) detected from the image G2 as shown in FIG. 6 by image processing.

Furthermore, although the first straight line L1 is obtained based on the luminance centroids b in the above embodiment, the present invention is not limited to this. For example, a center line of the luminance line K detected from the image G2 as shown in FIG. 6 by image processing may alternatively be set as the first straight line L1. In addition, although the first straight line L1 is obtained by using the least-squares method in the above embodiment, the calculation method is not limited to this.

Lastly, although various numerical values are mentioned in the above embodiment, such numerical values are given as mere examples, and should not interpreted as being limited to them.

What is claimed is:

1. An apparatus for manufacturing a three-dimensional image display device, comprising:
   a display controller configured to display a positioning image on a display panel,
   wherein the display panel is composed of a line of pixels which is a reference line of the display panel and lines of pixels which are arranged at intervals of widths of cylindrical lenses in a direction perpendicular to the reference line,
   the positioning image is an image in which two position detection marks are shown, and
   a virtual straight line connecting the two position detection marks is perpendicular to the reference line of the display panel;
   an imager configured to take an image of the display panel through a lens plate having a lenticular lens in which the cylindrical lenses are arranged, the display panel displaying the positioning image thereon;
   an obtaining unit configured to obtain a relative position of the display panel to the lenticular lens in a plane direction on the basis of a luminance line and the two position detection marks both of which are in the image taken by the imager; and
   a moving mechanism configured to perform positioning of the display panel relative to the lenticular lens by moving the display panel relative to the lens plate based on the relative position thus obtained,
   wherein the obtaining unit is configured to
      obtain a first straight line based on a plurality of luminance centroids respectively obtained from a plurality of detection regions dividing the luminance line,
      obtain a center of the display panel based on the two position detection marks, and obtain a second straight line passing the two position detection marks, and
      calculate a separation distance between the obtained first straight line and the obtained center, and calculate an angle between the obtained first straight line and the obtained second straight line.

2. The apparatus for manufacturing a three-dimensional image display device according to claim 1, further comprising a light irradiator configured to perform an irradiation operation of irradiating the display panel with light, wherein the display controller displays the positioning image on the display panel while causing the light irradiator to perform the irradiation operation.

3. A method of manufacturing a three-dimensional image display device, comprising:

displaying a positioning image on a display panel, wherein the display panel is composed of a line of pixels which is a reference line of the display panel and lines of pixels which are arranged at intervals of widths of cylindrical lenses in a direction perpendicular to the reference line, the positioning image is an image in which two position detection marks are shown, and a virtual straight line connecting the two position detection marks is perpendicular to the reference line of the display panel taking an image of the display panel through a lens plate having a lenticular lens in which the cylindrical lenses are arranged, the display panel displaying the positioning image thereon;

obtaining a relative position of the display panel to the lenticular lens in a plane direction on the basis of a luminance line and the two position detection marks both of which are in the image thus taken; and performing positioning of the display panel relative to the lenticular lens by moving the display panel relative to the lens plate based on the relative position thus obtained, wherein the obtaining further includes:

obtaining a first straight line based on a plurality of luminance centroids respectively obtained from a plurality of detection regions dividing the luminance line;

obtaining a center of the display panel based on the two position detection marks, and obtaining a second straight line passing the two position detection marks; and calculating a separation distance between the obtained first straight line and the obtained center, and calculating an angle between the obtained first straight line and the obtained second straight line.

4. The method of manufacturing a three-dimensional image display device according to claim 3, wherein the positioning image is displayed on the display panel while the display panel is irradiated with light.

\* \* \* \* \*